United States Patent [19]
Dwight, Jr. et al.

[11] Patent Number: 5,915,420
[45] Date of Patent: Jun. 29, 1999

[54] METHOD AND APPARATUS FOR REPAIRING PIPE

[76] Inventors: Paul F. Dwight, Jr., P.O. Box 20907, Wickenburg, Ariz. 85358; Jack C. Fisk, 343 N. Jefferson St., Wickenburg, Ariz. 85390

[21] Appl. No.: 09/008,645

[22] Filed: Jan. 16, 1998

[51] Int. Cl.[6] .................................................. F16L 55/16
[52] U.S. Cl. .............................. 138/99; 138/97; 156/94; 269/249
[58] Field of Search ...................... 138/97, 99; 285/420, 285/342, 343, 15; 156/94; 269/249, 270

[56] References Cited

U.S. PATENT DOCUMENTS

| 2,236,913 | 4/1941 | Merrill | 138/99 |
|---|---|---|---|
| 3,117,904 | 1/1964 | Black | 138/99 X |
| 3,487,857 | 1/1970 | Lee | 138/99 |
| 4,049,480 | 9/1977 | Kutschke | 138/99 X |
| 4,257,446 | 3/1981 | Ray | 137/368 |
| 4,342,338 | 8/1982 | Glennie | 138/99 |
| 4,610,439 | 9/1986 | Burghardt | 138/99 X |
| 5,365,977 | 11/1994 | Goad et al. | 138/99 |
| 5,496,076 | 3/1996 | Lin | 285/343 X |

*Primary Examiner*—Patrick Brinson
*Attorney, Agent, or Firm*—Parsons & Goltry; Michael W. Goltry; Robert A. Parsons

[57] ABSTRACT

In a substantially resilient conduit having fluid flowing therethrough from an upstream position to a downstream position and a breach intermediate the positions, a method of repairing the breach, the method comprising the steps of engaging the conduit at a location upstream of the breach to substantially interrupt the fluid flow through the conduit, repairing the breach, disengaging the conduit from the location to re-establish the fluid flow through the conduit, and reinforcing the location.

14 Claims, 4 Drawing Sheets

METHOD AND APPARATUS FOR REPAIRING PIPE

BACKGROUND OF THE INVENTION

1. Field of the Invention

This invention relates generally to the field of utilities.

More particularly, this invention relates to an apparatus and method of repairing utility lines.

In a further and more specific aspect, the present invention relates to an apparatus and method of repairing an underground substantially resilient conduit of a type for providing water service to homes and businesses.

2. Prior Art

A utility may be generally defined as a service, such as light, power or water, provided by a Public Utility. To communicate utility service to homes and business requires various types of equipment and a considerably extensive infrastructure to disseminate the service from the Public Utility. Primarily for practical purpose, most of this equipment and infrastructure is normally buried underground.

Water service is normally carried and communicated by water lines constructed of polyethylene piping buried within the ground. Polyethylene piping is desirable for its strength and resiliency thus proving to be an exemplary material for water service. To repair broken water lines normally requires the water to be turned off at a water main upstream of the break or tear in the line. After the water is turned off, workers may dig into the ground to make necessary repairs, after which the water may be turned on.

Water mains are normally buried in the ground. Thus, to turn off water entering a water line needing repair, workers must dig into the ground to access the water main. Because a given water line may service many homes and/or businesses, turning the water off at the water main will shut off the water completely thus leaving many establishments downstream of the water main without water during repair of the water line. Furthermore, the time required to dig and access the water main is not only time consuming, but also expensive due to the required equipment and labor.

It would be highly advantageous, therefore, to remedy the foregoing and other deficiencies inherent in the prior art.

Accordingly, it is an object of the present invention to provide a new and improved apparatus and method of repairing broken polyethylene water lines.

Another object of the present invention is to provide a new and improved apparatus and method of repairing a breach in a resilient conduit having fluid flowing therethrough from an upstream position to a downstream position.

And another object of the present invention is to provide a new and improved apparatus and method of repairing water lines having water passing therethrough.

Still another object of the present invention is the provision of a safe, easy and efficient method of repairing water lines.

Yet another object of the instant invention is the provision of decreasing the time and expense normally associated with the repair of underground water lines.

Yet still another object of the instant invention is to provide an apparatus for use in repairing water lines that is easy to construct.

And a further object of the invention is to provide an apparatus for use in repairing water lines that is easy to use.

Still a further object of the immediate invention is to provide an apparatus for use in repairing water lines that is inexpensive.

Yet a further object of the invention is to provide a new and improved method of repairing water lines that does not require the water to be turned off at a water main.

And still a further object of the invention is to provide a new and improved method of repairing water lines that is fast.

SUMMARY OF THE INVENTION

Briefly, to achieve the desired objects of the instant invention in accordance with a preferred embodiment thereof, provided is an apparatus and method of repairing a live utility conduit of a type providing water service to homes, businesses, etc. In this regard, in a substantially resilient conduit having a fluid, such as water, flowing therethrough from an upstream position to a downstream position and a breach intermediate the positions, the present invention provides a method of repairing the breach comprising the steps of engaging the conduit at a location upstream of the breach to substantially interrupt the fluid flow through the conduit, repairing the breach, disengaging the conduit from the location to re-establish the fluid flow through the conduit, and reinforcing the location.

To engage the conduit to interrupt the fluid flow in accordance with the present method may be carried out with an apparatus of type including an engagement member and a complemental engagement member mounted for movement in reciprocal directions in substantial opposition to the engagement member between a first position toward the engagement member and a second position spaced away from the engagement member. With the conduit positioned between the engagement and complemental engagement members, the complemental engagement member may be moved into the first position for the engagement and complemental engagement members to cooperate together and crimp the conduit for substantially interrupting the fluid flow through the conduit. To re-establish the fluid flow through the conduit, the complemental engagement member may be moved into the second position spaced away from the engagement member.

BRIEF DESCRIPTION OF THE DRAWINGS

The foregoing and further and more specific objects and advantages of the present invention swill become readily apparent to those skilled in the art from the following detailed description thereof taken in conjunction with the drawings in which.

DETAILED DESCRIPTION OF PREFERRED EMBODIMENTS

The present invention provides, among other things, an apparatus and method of repairing live utility lines. In a further and more specific aspect, the present invention provides a new and improved apparatus and method of repairing a live utility conduit of a type for servicing homes and businesses with water. In this regard, the present invention is uniquely adapted for repairing live water lines or conduits constructed of polyethylene or other similarly resilient material. The term "live utility conduit" as used herein, a term commonly used by those skilled in the art, is generally intended to define a utility conduit having water flowing therethrough for providing water service to homes, businesses, etc.

Figure 1:
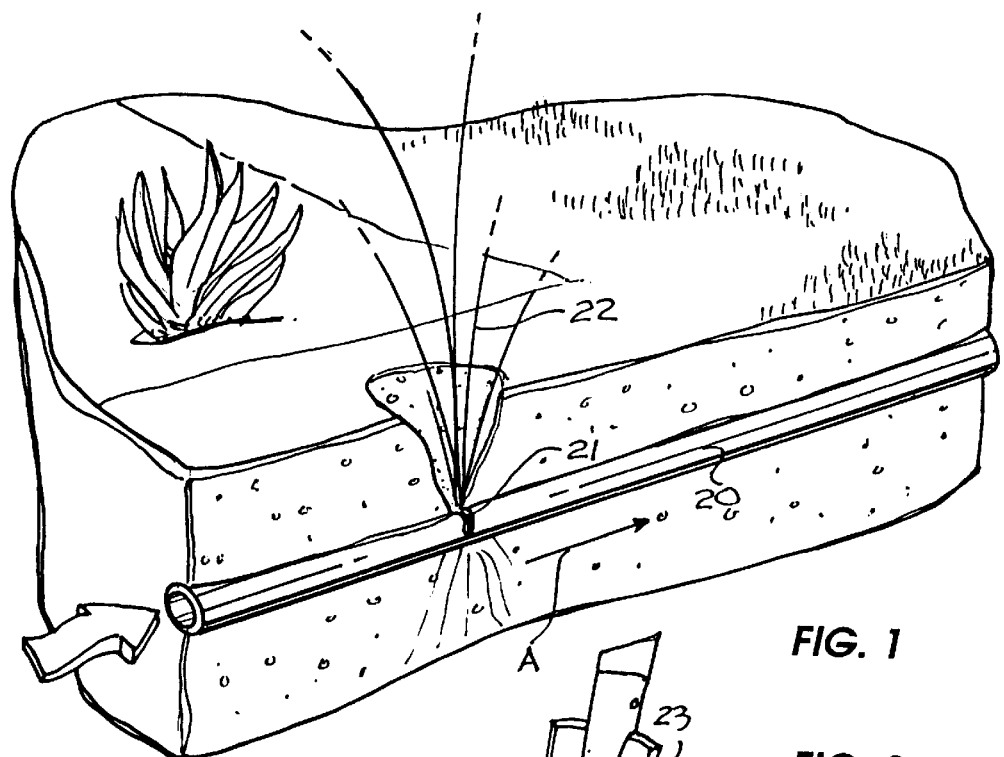
FIG. 1 illustrates a perspective view of a breach formed in a live utility conduit buried in the ground, the live utility conduit having fluid passing therethrough from an upstream location to a downstream location.

Turning now to the drawings, in which like reference characters indicate corresponding elements throughout the several views, attention is first directed to FIG. 1 illustrating a perspective view of a live utility conduit 20 shown as it would typically appear buried within the ground. Conduit 20 is operative for communicating water from an upstream location to a downstream location in a direction generally indicated by the arrowed line A. Preferably constructed of polyethylene or other substantially resilient material consistent with the desired teachings of the present invention, conduit 20 is shown having a breach 21 through which water 22 is leaking, breach 21 thus requiring repair.

Figure 2:
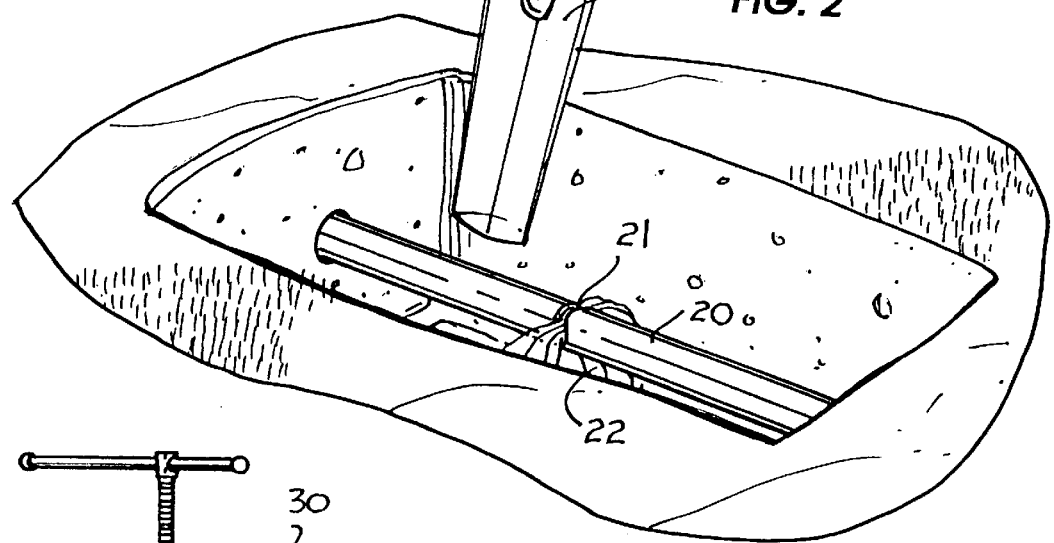
FIG. 2 illustrates a perspective view of the breach in the utility line of FIG. 2 having been exposed by digging in task performed in accordance with a method of repairing a breach in a live utility conduit, in accordance with a preferred embodiment of the present invention.
Figure 3:
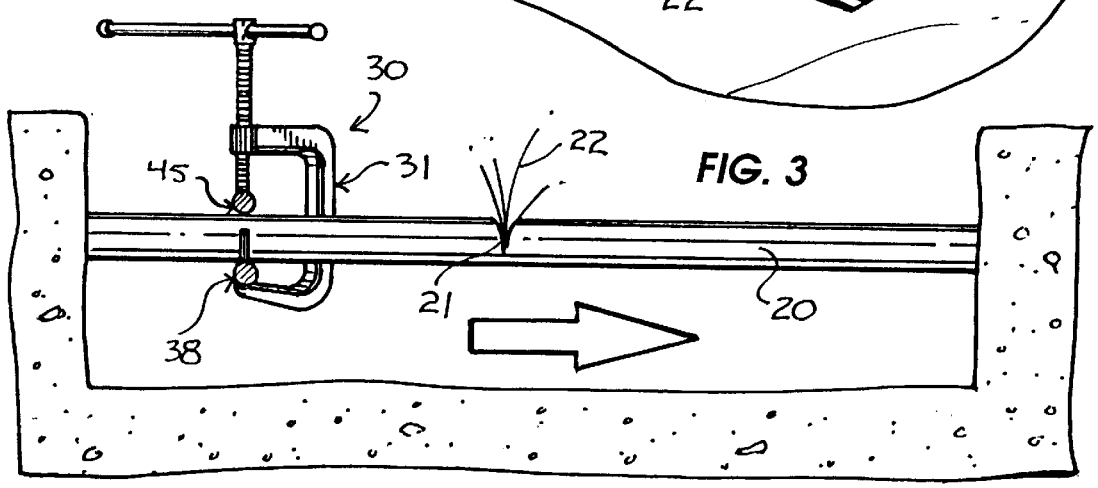
FIG. 3 illustrates a side elevational view of the live utility conduit of FIG. 2 and an apparatus having an engagement member and a complemental engagement member shown mounted with the live utility conduit at a location upstream of the breach in a task performed in accordance with a method of repairing a breach in a live utility conduit.

To this end, the method of the present invention first begins with a task of exposing conduit 20 at breach 21 as shown in FIG. 2 such as by digging into the ground either manually with a shovel 23, or perhaps with mechanized digging machinery. Upon exposure of conduit 20 and breach 21 as shown in FIG. 2 and FIG. 3, the present method further provides for the tasks of engaging and crimping conduit 20 at a location upstream of breach 21 to substantially interrupt the flow of water downstream from the location. In this regard, FIG. 3 further illustrates an apparatus 30 shown mounted with conduit 20 and uniquely adapted for engaging and crimping conduit 20 to substantially interrupt the flow of water consistent with the present method.

Figure 11:
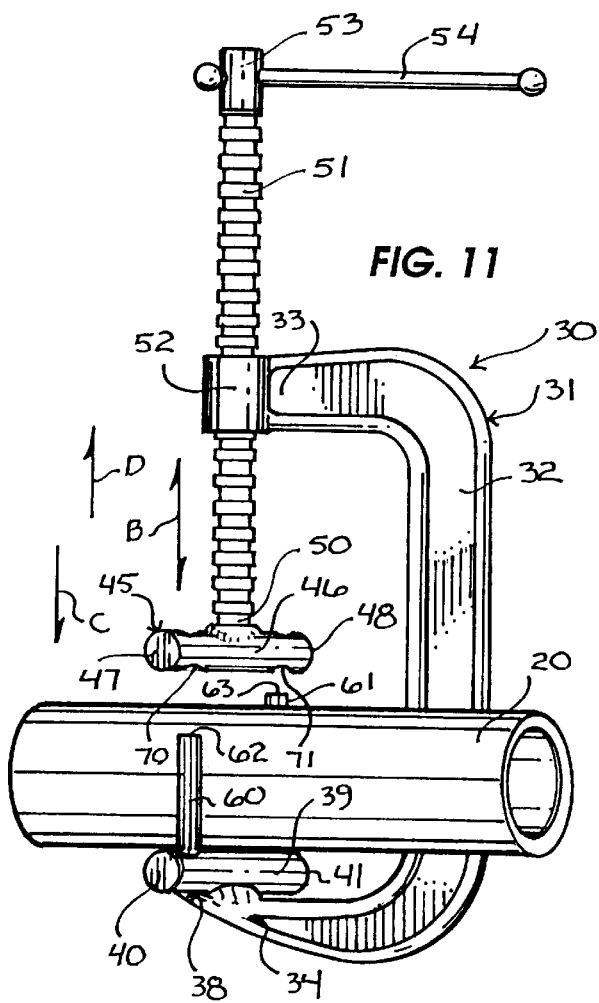
FIG. 11 illustrates a side elevational view of the apparatus first set forth in FIG. 3.

With momentary attention directed to FIG. 11 illustrating a side elevational view of apparatus 30, apparatus 30 is generally comprised of a base 31 provided, in this specific example, as a substantially C-shaped element 32 having spaced apart substantially opposing first and second free ends 33 and 34. Second free end 34 carries an engagement member 38 shown, in this specific example, as an elongate substantially cylindrical member 39 having opposing free ends 40 and 41. Apparatus 30 further includes a complemental engagement member 45 mounted with base 31 for movement in reciprocal directions as generally indicated by the double arrowed line B in substantial opposition to engagement member 38 between a first position toward engagement member 38 and a second position spaced away from engagement member 38. In this specific embodiment, complemental engagement member 45 is provided in the form of an elongate substantially cylindrical member 46 having opposing free ends 47 and 48, elongate member 46 being substantially coextensive with elongate member 39.

Figure 5:
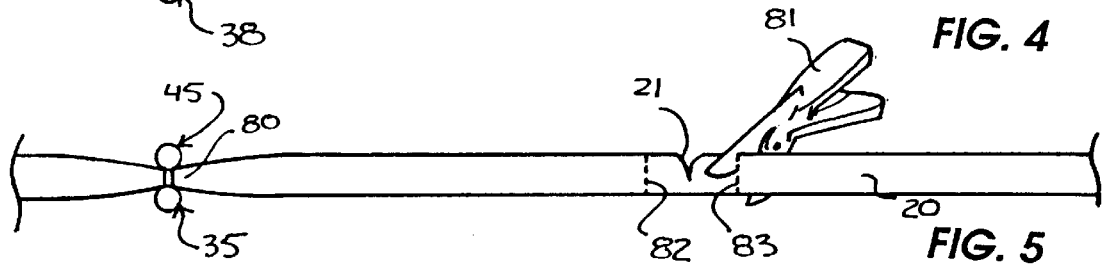
FIG. 5 illustrates a view very similar to the view of FIG. 4 with the engagement member and a complemental engagement member shown engaging and crimping the live utility conduit to interrupt the flow of fluid downstream toward the breach with the live utility conduit shown being severed adjacent the breach to remove the breach to form an upstream end and a downstream end in the live utility conduit in tasks performed in accordance with a method of repairing a breach in a live utility conduit.

To provide reciprocal movement of complemental engagement member 45, complemental engagement member 45 is shown carried or otherwise mounted for radial rotation, such as by journaled engagement, with a proximal end 50 of an elongate threaded member 51 threadably carried by a threaded collar 52 mounted with first free end 33, elongate threaded member 51 terminating outwardly with a distal end 53. Preferably axially aligned relative engagement member 38, elongate threaded member 51 may be rotated in predetermined directions for moving elongate threaded member 51, and complemental engagement member 45, in reciprocal directions in substantial opposition to engagement member 38. Selected rotation of elongate threaded member 51 may be carried out either manually or with the aid of a machine. In this regard, FIG. 5 illustrates a handle 54 carried by distal end 53 that a user may grasp to rotate elongate threaded member 51 as desired. Although not shown, distal end 53 may be provided with, for instance, a hexagonal or octagonal nut engagable by a pneumatic air ratchet that may be selectively actuated for imparting desired rotation to elongate threaded member 51.

Figure 13:
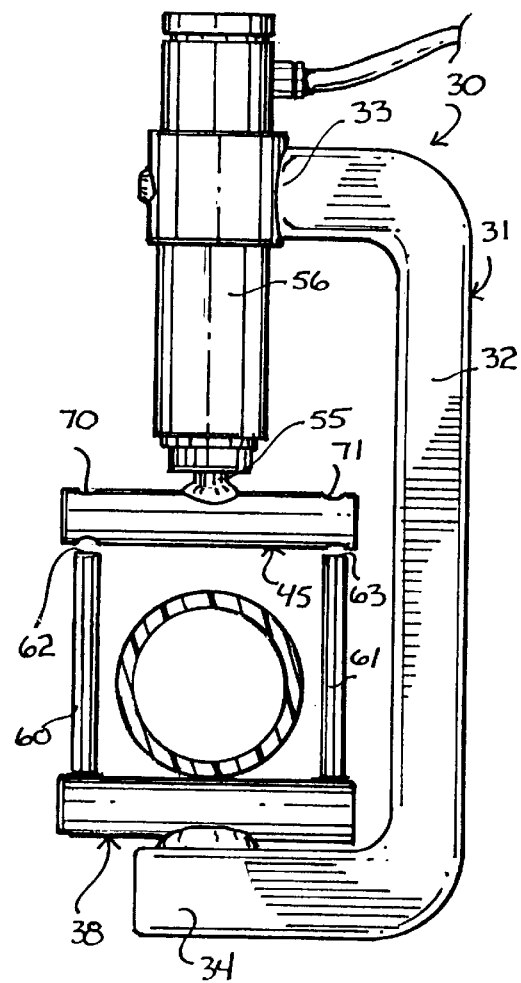
FIG. 13 illustrates an alternate embodiment of an apparatus for engaging and crimping a live utility conduit.

To provide reciprocal movement of complemental engagement member 45 relative engagement member 38 in accordance with an alternate embodiment of apparatus 30 as set forth in FIG. 13, complemental engagement member 45 may alternatively be mounted for radial rotation, such as by journaled engagement, with an end 55 of a hydraulic cylinder assembly 56 mounted with a collar 57 carried by first free end 33 of base 31 in substantial opposition to engagement member 38. In this regard, and like conventional hydraulic cylinder assemblies, cylinder assembly 58 may be selectively actuated for imparting reciprocating movement to complemental engagement member 45 between the first and second positions as herein described.

With continuing reference to FIG. 11, engagement member 38 and complemental engagement member 45 carry an engagement assembly and a complemental engagement assembly, respectively, operative for detachably engaging engagement member 38 with complemental engagement member 45 in the first position of complemental engagement member 45. In FIG. 11, the engagement assembly is generally comprised of first and second substantially coextensive elongate elements 60 and 61 carried by engagement member 38 in spaced-apart and substantially parallel relation, each elongate element 60 and 61 terminating outwardly with a free end 62 and 63, respectively, directed toward complemental engagement member 45. In this specific example, the complemental engagement assembly is generally comprised of first and second apertures or ways 70 and 71 carried by and extending through complemental engagement member 45 in spaced-apart relation and in substantial opposition to first and second elongate elements 60 and 61, respectively. In this regard, upon movement of complemental engagement member 45 in the direction indicated by the arrowed line C from the second position as shown in FIG. 11, and with complemental engagement member 45 positioned in substantially parallel relation with engagement member 38 to align first and second ways 70 and 71 substantially with free ends 62 and 63 of first and second elongate elements 60 and 61, first and second elongate elements 60 and 61 may pass into and through first and second ways 70 and 71, respectively, in a direction from free ends 62 and 63 thus providing for the detachable engagement of engagement member 38 with complemental engagement member 45 in the first position of complemental engagement member 45.

In operation, and in the second position of complemental engagement member 45, apparatus 30 may be positioned to engage conduit 20 with engagement member 38 intermediate first and second elongate elements 60 and 61. With conduit 20 so positioned and first and second elongate elements 60 and 61 located on either side of conduit 20, complemental engagement member 45 may be moved toward engagement member 38 in the direction indicated by the arrowed line C to engage conduit 20 and to detachably engage first and second elongate elements 60 and 61 with first and second ways 70 and 71 as previously discussed, engagement and complemental engagement members 38 and 45 and first and second elongate elements 60 and 61 cooperating together to bound conduit 20. So installed, complemental engagement member 45 may be moved into the first position toward engagement member 38 in the direction indicated by the arrowed line C to crimp conduit 20 by engagement and complemental engagement members 38 and 45, as shown in FIG. 5, to interrupt the water flow passing through conduit 20.

To re-establish the flow of water through conduit 20, complemental engagement member 45 may, be moved away from engagement member 38, such as by rotation of elongate threaded element 51, in the direction indicated by the arrowed line D in FIG. 11 into the second position of complemental engagement member 45. Because conduit 20 is constructed of polyethylene or other substantially resilient material, conduit 20 will resume its original shape substantially upon disengagement of engagement and complemental engagement members 38 and 39 from conduit 38.

Figure 12:
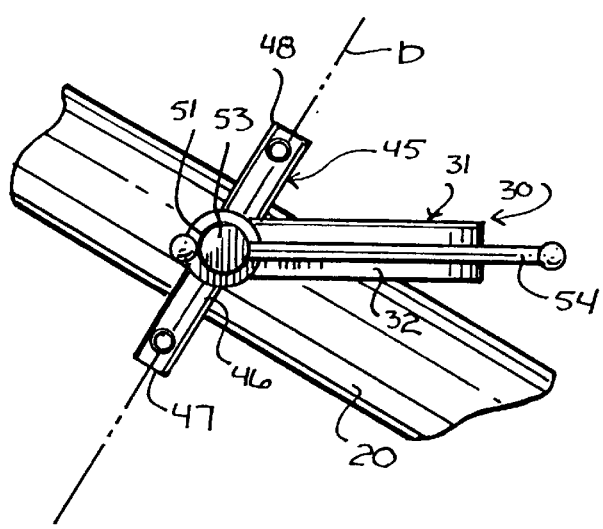
FIG. 12 illustrates a top elevational view of the apparatus of FIG. 11 shown as it would appear installed with a live utility conduit.

FIG. 12 illustrates a top plan view of apparatus 30 as it would appear mounted with conduit 20 in the foregoing manner with engagement member 38 detachably engaged with complemental engagement member 45. Detachably engaged in the foregoing manner, engagement member 38 (not shown in FIG. 12) and complemental engagement member 45 cooperate to define a longitudinal axis D. To permit engagement and complemental engagement members 38 and 45 to be installed with and engage conduit 20 without base 31 interfering with conduit 20, base 31 may be mounted, as shown, to diverge outwardly from axis D outside of the perpendicular. In an alternate embodiment, base 31 may be provided to reside substantially within axis D if so desired. Furthermore, engagement member 38, although set forth as preferably rigidly mounted with second free end 34 of base, may, in an alternate embodiment, be mounted with second free end 34 for radial rotation, such as by journaled engagement, to permit a user to pivot or otherwise position base 31 so as not to interfere with conduit 20.

Figure 4:
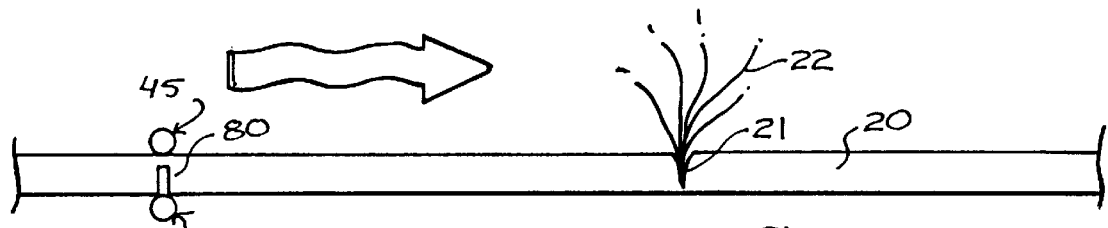
FIG. 4 illustrates a view substantially similar to the view of FIG. 3.

Consistent with the foregoing discussion of apparatus 30 and the alternate embodiment of apparatus 30 set forth in FIG. 13, attention is directed back to FIG. 3 and FIG. 4 showing engagement and complemental engagement members 38 and 45 (only engagement and complemental engagement members 38 and 45 of apparatus 30 are shown in FIGS. 4–9) of apparatus 30 mounted to engage conduit 20 upstream of breach 21. In this regard, complemental engagement member 45 may be moved into the first position toward engagement member 38 for engagement and complemental engagement members 38 and 45 to cooperate and crimp conduit 20 at a location 80 upstream of breach 21 to substantially interrupt the flow of water downstream from location 80 as shown in FIG. 5. With conduit 20 crimped in the foregoing manner, conduit 20 may then be severed, such as with scissors 81, on either lateral side of breach 21 to extract or otherwise remove breach from conduit 20 to form an upstream end 82 and a downstream end 83 of conduit 20.

With upstream and downstream ends 82 and 83 so formed, a first repair element 84 may be positioned upon conduit 20 downstream of downstream end 83 and a second repair element 85 may be positioned upon conduit 20 intermediate upstream end 82 and location 80. First and second repair elements 84 and 85 are substantially identical and known to those having regard toward the art. Commonly referred to as couplers found under the exemplary trademark JOHNSON®, each first and second repair element 84 and 85 is generally comprised of a continuous sidewall 90 having first and second ends 91 and 92, first and second adjustment elements 93 and 94 adjustably and threadably carried by first and second ends 91 and 92, respectively, and first and second gaskets 95 and 96 each captured, respectively, between first adjustment element 93 and the first end 91 and second adjustment element 94 and second end 92, each first and second repair element 84 and 85 further bounding a 97 bore extending from first adjustment element 93 to the second adjustment element 94.

Figure 6:
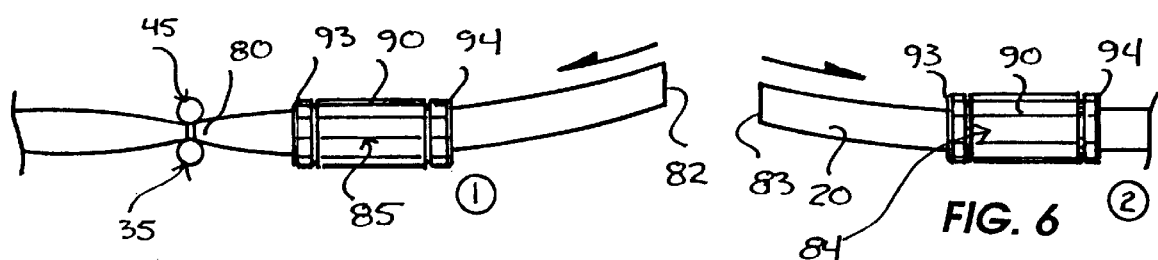
FIG. 6 illustrates a view very similar to the view of FIG. 5 showing a first repair element mounted with the live utility conduit downstream of the downstream end and a second repair element mounted with the live utility conduit intermediate the upstream end and the engagement and complemental engagement members in tasks performed in accordance with a method of repairing a breach in a live utility conduit.
Figure 7:
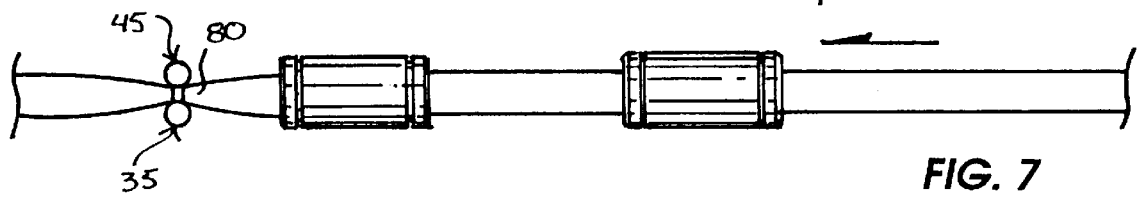
FIG. 7 illustrates a view similar to the view of FIG. 6 showing the first repair element mounted to interconnect the upstream and downstream ends of the live utility conduit in a task performed in accordance with a method of repairing a breach in a live utility conduit.
Figure 8:
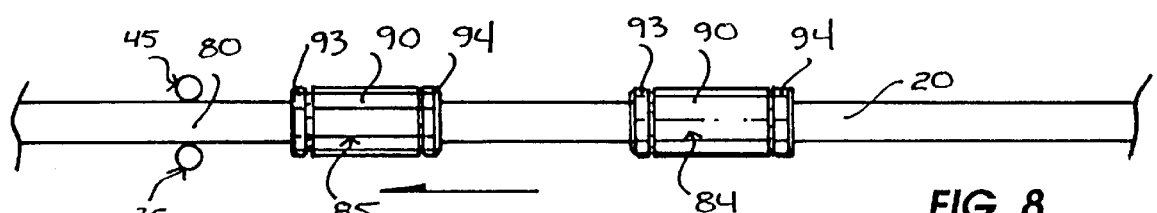
FIG. 8 illustrates a view very similar to the view of FIG. 7 showing the engagement member and a complemental engagement member disengaged from the live utility conduit to re-establish the flow of fluid therethrough in a task performed in accordance with a method of repairing a breach in a live utility conduit.
Figure 9:
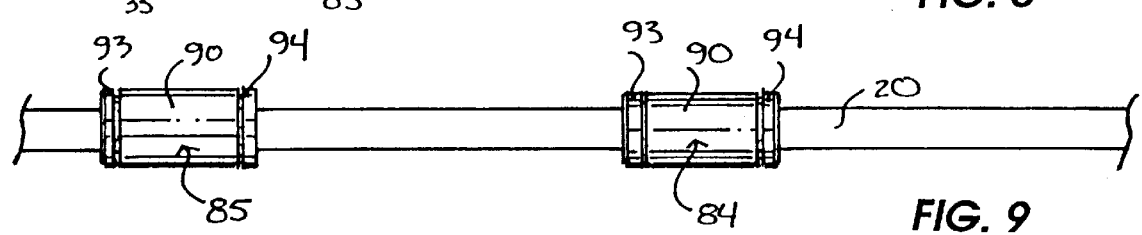
FIG. 9 illustrates a view very similar to the view of FIG. 8 showing the second repair element mounted with the live utility conduit to bridge and reinforce the location in a task performed in accordance with a method of repairing a breach in a live utility conduit.
Figure 10:
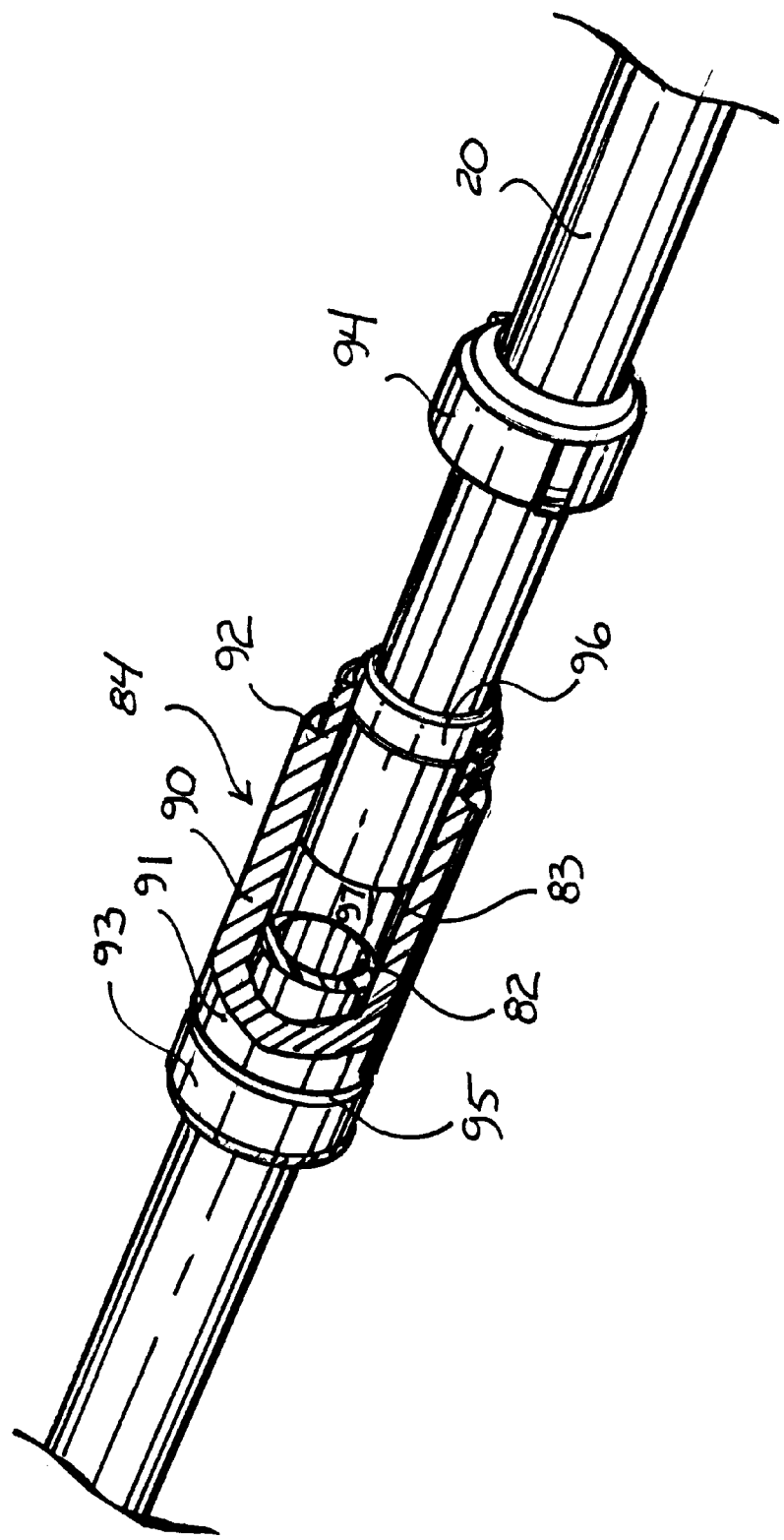
FIG. 10 illustrates a perspective view of the live utility conduit of FIG. 9 showing the first repair element shown as it would appear installed, with portions of the first repair element broken away for the purposes of illustration.

To mount first and second repair elements 84 and 85 with conduit 20 as shown in FIG. 6, downstream end 83 may be inserted into and through bore 97 of first repair element 84 and upstream end 82 of conduit 82 may be inserted into and through bore 97 of second repair element 85. So mounted, first repair element 84 may be located on conduit 20 with downstream end 83 to reside intermediate the first and second ends 91 and 92 of continuous sidewall 90 as shown in FIG. 10, and upstream end 82 may be inserted into bore 97 of first repair element 84 in substantial opposition to downstream end 83. With upstream and downstream ends 82 and 83 captured within bore 97 of first repair element 84, first and second adjustment elements 93 and 94 may be adjusted or tightened, such as by rotation, with each first and second end 91 and 92 of continuous sidewall 90 to sealingly engage each of the first and second gaskets 95 and 96 with conduit 20 at upstream and downstream ends 82 and 83, respectively, and to detachably engage first and second ends 91 and 92 with the upstream and downstream ends 82 and 83, respectively. So installed and secured, first repair element 84 operates to interconnect upstream end 82 with downstream end 83 in fluid communication thus effecting repair of the breach in conduit 20 as shown in FIG. 7. With conduit 20 repaired, complemental engagement member 45 may be moved into the second position spaced away from engagement member 38 as shown in FIG. 8 to disengage engagement and complemental engagement members 38 and 45 from conduit 20 and re-establish the flow of water through conduit 20.

To reinforce conduit 20 or otherwise repair any fractures or breaches that conduit 20, may have invariably sustained at location 80 as a result of crimping, second repair element 85 may be located to bridge location 80 and then secured with conduit 20 by virtue of adjusting the first and second adjustment elements 93 and 94 thereof to sealingly engage each of the first and second gaskets 95 and 96 with conduit 20 at either side of location 80 and to detachably engage each of the opposing first and second ends 91 and 92 of continuous sidewall 90 with conduit 20 at either side of location 80. Securing second repair element 85 with conduit 20 to reinforce location 80 is important for preventing location 80 from otherwise breaching as a result of damage that location 80 may have sustained during the crimping process.

The present invention has been described above with reference to a preferred embodiment. However, those skilled in the art will recognize that changes and modifications may be made in the described embodiments without departing from the nature and scope of the present invention. For instance, although first and second repair elements 84 and 85 have been herein disclosed as a preferred means for repairing and reinforcing conduit 20, other means of repair and reinforcement may be used consistent with the present disclosure if so desired. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a substantially resilient conduit having fluid flowing therethrough from an upstream position to a downstream position and a breach intermediate the positions, a method of repairing the breach, the method comprising the steps of:

engaging the conduit at a location upstream of the breach to substantially interrupt the fluid flow;

severing the conduit proximate the breach to form an upstream end and a downstream end of the conduit;

providing first and second couplers, each coupler including a continuous sidewall having first and second ends, first and second adjustment elements adjustably carried by the first and second ends, respectively, and first and second gaskets each captured respectively between the first adjustment element and the first end and the second adjustment element and the second end, each coupler further bounding a bore extending from the first adjustment element to the second adjustment element;

inserting the upstream end of the conduit into and through the bore of the second coupler;

inserting the downstream end of the conduit into the bore of the first coupler;

inserting the upstream end of the conduit into the bore of the first coupler in substantial opposition to the downstream end of the conduit;

adjusting the first and second adjustment elements of the first coupler to sealingly engage each of the first and second gaskets with one of the upstream and downstream ends of the conduit and to detachably engage each of the opposing ends of the first coupler with one of the upstream and downstream ends of the conduit;

disengaging the conduit from the location to re-establish the fluid flow through the conduit; and locating the second coupler to bridge the location;

adjusting the first and second adjustment elements of the second coupler to sealingly engage each of the first and second gaskets with the conduit at either side of the location and to detachably engage each of the opposing ends of the second coupler with the conduit at either side of the location.

2. The method of claim 1, wherein the step of engaging the conduit further includes the step of crimping the conduit.

3. The method of claim 2, wherein the step of crimping the conduit further includes the steps of:

providing an engagement member;

providing a complemental engagement member;

mounting the complemental engagement member for movement in reciprocal directions between a first position and a second position in substantial opposition to the engagement member;

engaging the engagement member and the complemental engagement member with the conduit;

moving the complemental engagement member into one of the first and second positions to crimp the conduit by the engagement and complemental engagement members to interrupt the fluid flow therethrough.

4. The method of claim 2, wherein the step of clamping the conduit further includes the steps of:

providing an engagement member;

providing a complemental engagement member;

mounting the complemental engagement member for movement in reciprocal directions between a first position and a second position in substantial opposition to the engagement member;

engaging the engagement member and the complemental engagement member with the conduit;

coupling the engagement member with the complemental engagement member to capture the conduit; and moving the complemental engagement member into one of the first and second positions to crimp the conduit by the engagement and complemental engagement members to interrupt the fluid flow therethrough.

5. The method of claim 4, wherein the step of coupling the engagement member with the complemental engagement member further includes the steps of:

providing an engagement assembly carried by the engagement member;

providing a complemental engagement assembly carried by the complemental engagement member; and detachably engaging the engagement assembly with the complemental engagement assembly.

6. The method of claim 5, wherein the step of providing an engagement assembly further includes the step of providing first and second substantially coextensive elongate elements carried by the engagement member in spaced-apart and substantially parallel relation and each terminating outwardly with a free end.

7. The method of claim 6, wherein the step of providing a complemental engagement assembly further includes the step of providing first and second ways carried by the complemental engagement member in spaced-apart relation, each one of the first and second elongate elements detachably receivable into and through one of the first and second ways in a direction from the free ends in one of the first and second positions of the complemental engagement member, the engagement member, the complemental engagement member and the first and second elongate elements cooperating together to bound the conduit in one of the first and second positions of the complemental engagement member.

8. The method of claim 4, wherein the step of mounting the complemental engagement for movement in reciprocal directions further includes the steps of:

providing means for imparting movement in reciprocal direction; and mounting the complemental engagement member with the means; and mounting the means in substantial opposition to the engagement member.

9. The method of claim 8, wherein the steps of providing means for imparting movement in reciprocal direction and mounting the means in substantial opposition to the engagement member further include the steps of:

providing an elongate threaded element;

threadably mounting the elongate threaded element in substantial opposition to the engagement member.

10. The method of claim 8, wherein the steps of providing means for imparting movement in reciprocal direction and mounting the means in substantial opposition to the engagement member further include the steps of:

providing a cylinder assembly;

mounting the cylinder assembly in substantial opposition to the engagement member.

11. In a substantially resilient conduit having fluid flowing therethrough from an upstream position to a downstream position, an apparatus for engaging and crimping the conduit to substantially interrupt the fluid flow, the apparatus comprising:

a base;

substantially coextensive first and second elongate members carried by the base in spaced apart and substantially parallel relation, the second elongate member movable in reciprocal directions between a first position toward the first elongate member and a second position away from the first elongate member;

substantially coextensive first and second elongate elements each carried adjacent one of free ends of one of the first and second elongate members and extending outwardly toward the other one of the first and second elongate members; and first and second ways each carried adjacent one of free ends of the other one of the first and second elongate members, each one of the first and second elongate elements receivable into and through one of the first and second ways upon movement of the second elongate member from the second position toward the first position for capturing a conduit, for detachably engaging the first elongate member with the second elongate member and for maintaining the first and second elongate members in substantially parallel relation along movement of the second elongate member from the second position to the first position to crimp the conduit.

12. The apparatus of claim 11, further including means carried by the second elongate member for moving the second elongate member in reciprocal directions between the first and second positions.

13. The apparatus of claim 12, wherein the means comprises an elongate threaded element threadably carried by the base.

14. The apparatus of claim 12, wherein the means comprises a cylinder assembly carried by the base.

* * * * *